(No Model.)

A. ITTNER.
LUBRICATOR.

No. 284,303. Patented Sept. 4, 1883.

WITNESSES:
E. C. Davidson
James Young

INVENTOR:
Anthony Ittner
by his Attorneys
Baldwin, Hopkins & Peyton

UNITED STATES PATENT OFFICE.

ANTHONY ITTNER, OF ST. LOUIS, MISSOURI.

LUBRICATOR.

SPECIFICATION forming part of Letters Patent No. 284,303, dated September 4, 1883.

Application filed June 26, 1883. (No model.)

*To all whom it may concern:*

Be it known that I, ANTHONY ITTNER, a citizen of the United States, residing at St. Louis, in the State of Missouri, have invented a new and useful Improved Automatic Lubricator, of which the following is a specification.

The object of my invention is to overcome the difficulties in oiling the various parts of machinery, and to supply a continuous flow of oil from a stationary tank or cup automatically to the parts to be oiled, thereby assuring safety and saving time, labor, and expense. It is specially applicable to those classes of machines which have their parts exposed to dust and dirt, such as brick-machines and the like; also to machines wherein the movable parts are inaccessible by the ordinary oil cup or can while running, or necessitating the stoppage of same during oiling up.

Figure 1:
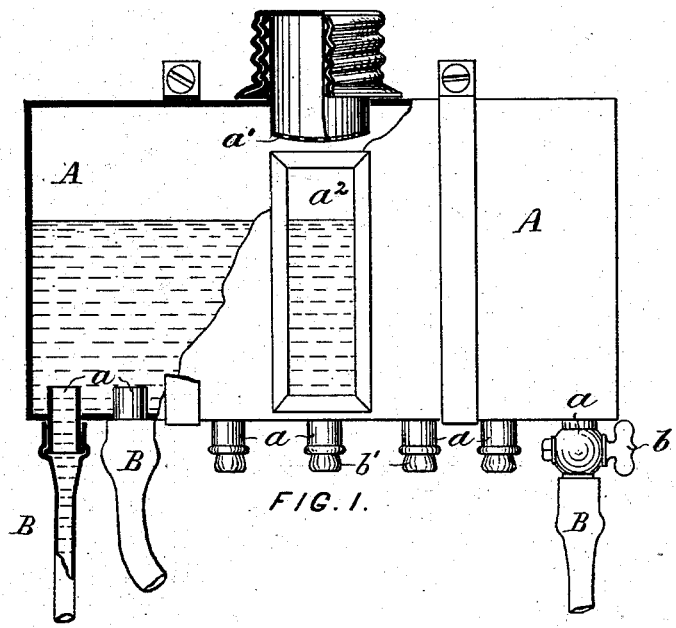
Figure 2:
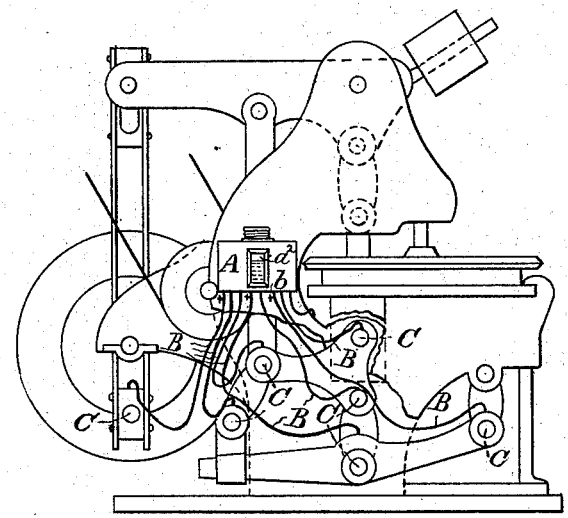

Of the drawings, Figure 1 is a part front elevation and part section of the oil tank or cup with my improvements shown. Fig. 2 shows the lubricator as applied to a machine.

Similar letters refer to similar parts throughout the several views.

A is the oil tank or cup. This is held stationary on the frame of the machine or any other convenient place, as may be deemed best.

B are flexible tubes or rubber hose. These are attached at one end to the tank or cup A by the stiff tubes or couplings $a$, which are rigid in the bottom of the cup or tank, and extend up in the latter far enough so as to extend above the sediment which may be contained in the oil. The other end is attached to the part of the machinery to be oiled, and thus the tube conveys the oil from the stationary tank or cup automatically to said part by virtue of the cup being higher than any part of the machinery which it is intended to oil. $b$ is a cock which regulates the supply.

C in Fig. 2 are journals oiled by the lubricator. The heavy black lines B represent the tubes in Fig. 2. The tubes, being flexible, are thus continually supplying oil to the journals, their flexibility allowing them to follow up the motions of the various parts and to admit of their being turned and twisted in and out and around other parts in order to reach their particular journal.

It will be seen that a vast amount of time is saved. All that is required is to keep the tank or cup full after the connection is made and that no stoppage of the machine is required. The tank or cup is filled from the top, and a fine sieve or screen, $a'$, prevents any thickened oil or sediments from entering the cup or tank, and at the same time prevents any dirt or dust from falling into same.

$a^2$ is a glass placed in the front or side of the tank or cup, and acts as a gage to show the height of or amount of oil in same, and so that it may be seen from the outside.

The cup is fastened to the frame of the machine or any other convenient place, and must be above the parts which it is intended to oil.

The rubber or flexible hose may be of any size to suit the demand of oil to be supplied, and may be of any number, one, however, oiling only one part, unless the size of the journal may require more than one.

$b'$ are stoppers inserted into the rigid coupling-tubes $a$ when the hose is detached and no cock is provided.

I am aware that tubes of copper sufficiently pliable to be bent to place have been used to convey lubricating substance from a reservoir to the journals of rolls, and that such metal tubes have sufficient pliability also to spring or bend to accommodate slight adjustments of the journal-box. My invention is designed as an improvement upon such lubricating apparatus, and to be adapted to lubricate journals, pivots, knuckle-joints, and the like—such as found in cranks, piston-rods, &c.—where large and varied movements of the journals or joints to be lubricated are necessary. My invention is accordingly limited to the employment of such flexible tubes as will freely accommodate these larger movements of parts to be lubricated, which copper tubes and the like are from their nature incapable of doing. Accordingly,

Having thus fully described my invention, what I claim as an improvement in lubricating apparatus is—

1. A flexible tube or hose, B, in combination with an oil-cup, A, and attached to same for leading oil to a movable journal of machinery, and to form an automatic lubricator, as and for the purpose shown and described.

2. In a lubricator, the rubber or flexible hose B, tank or cup A, having glass $a^2$, screen $a'$, and the rigid coupling-tubes $a$, provided with a cock, $b$, or stopper $b'$, all combined to operate as herein shown and described, and for the purpose of oiling a movable journal, C, as set forth.

In testimony of said invention I have hereunto set my hand.

ANTHONY ITTNER.

Witnesses:
CHAS. F. MEISNER,
D. MEISNER.